(12) United States Patent
Ogawa et al.

(10) Patent No.: US 11,909,080 B2
(45) Date of Patent: Feb. 20, 2024

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventors: Tomoya Ogawa, Okazaki (JP); Junichi Matsuo, Okazaki (JP); Tatsuya Fukami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 617 days.

(21) Appl. No.: 17/112,335

(22) Filed: Dec. 4, 2020

(65) Prior Publication Data

US 2021/0202967 A1 Jul. 1, 2021

(30) Foreign Application Priority Data

Dec. 27, 2019 (JP) .................. 2019-237960

(51) Int. Cl.
*H01M 10/44* (2006.01)
*H01M 8/04223* (2016.01)
(Continued)

(52) U.S. Cl.
CPC ..... *H01M 8/04253* (2013.01); *H01M 8/0432* (2013.01); *H01M 8/04179* (2013.01); *H01M 8/04231* (2013.01); *H01M 8/04828* (2013.01); *H01M 10/0525* (2013.01); *H01M 10/44* (2013.01); *H01M 10/443* (2013.01); *H01M 12/08* (2013.01); *H01M 16/006* (2013.01);
(Continued)

(58) Field of Classification Search
CPC ......... H01M 8/04253; H01M 8/04179; H01M 8/04231; H01M 8/0432; H01M 8/04828; H01M 10/0525; H01M 10/44; H01M 10/443; H01M 12/08; H01M 16/006; H01M 2220/20; H01M 2250/20; H02J 7/34
USPC ........................................ 320/101
See application file for complete search history.

(56) References Cited

U.S. PATENT DOCUMENTS

| 2007/0026278 A1* | 2/2007 | Wake ................ H01M 8/04753 |
| | | 429/513 |
| 2015/0153416 A1* | 6/2015 | Umemura ............. H02J 7/0031 |
| | | 320/107 |
| 2019/0006686 A1* | 1/2019 | Carralero .......... H01M 8/04358 |

FOREIGN PATENT DOCUMENTS

| JP | 2007-42313 A | 2/2007 |
| JP | 2018-113126 A | 7/2018 |

* cited by examiner

*Primary Examiner* — Nathaniel R Pelton
(74) *Attorney, Agent, or Firm* — Finnegan, Henderson, Farabow, Garrett & Dunner, LLP

(57) ABSTRACT

A fuel cell system includes a fuel cell, a gas supply unit, an electric power storage device, a remaining capacity monitor, and a control unit. The control unit determines whether the temperature conditions are met, wherein the low temperature conditions include temperature related to a state of the fuel cell being equal to or lower than a predetermined threshold value set, when the control unit determines that the low temperature conditions are met, the control unit executes the purging process so as to discharge more of moisture stored in the fuel cell to an outside of the fuel cell, as compared with when the control unit determines that the low temperature conditions are not met, and the control unit executes the charging process with target remaining capacity of the electric power storage device set to a smaller value, as compared with when the control unit determines that the low temperature conditions are not met.

5 Claims, 6 Drawing Sheets

(51) Int. Cl.
*H01M 16/00* (2006.01)
*H01M 8/04828* (2016.01)
*H01M 8/0432* (2016.01)
*H01M 10/0525* (2010.01)
*H01M 8/04119* (2016.01)
*H02J 7/34* (2006.01)
*H01M 12/08* (2006.01)

(52) U.S. Cl.
CPC ........... *H02J 7/34* (2013.01); *H01M 2220/20* (2013.01); *H01M 2250/20* (2013.01)

FUEL CELL SYSTEM AND CONTROL METHOD OF FUEL CELL SYSTEM

CROSS REFERENCE TO RELATED APPLICATIONS

The present application claims a priority based on Japanese Patent Application No. 2019-237960 filed on Dec. 27, 2019, and all of the disclosure thereof is incorporated herein by reference.

BACKGROUND

Field

The present disclosure relates to a fuel cell system and a control method of the fuel cell system.

Related Art

As for a fuel cell system including a fuel cell and an electric power storage device, for example, Japanese Patent Application Laid-Open Publication No. 2007-042313 discloses a configuration in which purging process and restart the system are reliably executed, by charging the electric power storage device to a more amount of charge in stopping the system at low temperature, as compared with the case in stopping the system at normal temperature.

However, in some cases, the allowable charging power corresponding to the upper limit in controlling power for charging an electric power storage device is restricted at low temperature. In such cases, it may take a long time to increase an amount of charge in the electric power storage device, and thus the time required for completing the stopping of the system may be prolonged.

SUMMARY

In one aspect of the present disclosure, a fuel cell system is provided. The fuel cell system includes a fuel cell, a gas supply unit configured to supply gas to the fuel cell, an electric power storage device capable of storing at least electric power generated by the fuel cell, a remaining capacity monitor configured to detect remaining capacity in the electric power storage device; and a control unit configured to execute purging process for purging an inside of the fuel cell with the gas by driving the gas supply unit, and charging process for charging the remaining capacity of the electric power storage device with the power generated by the fuel cell, wherein upon input of stop instruction of the fuel cell system, the control unit determines whether the temperature conditions are met, wherein the low temperature conditions include temperature related to a state of the fuel cell being equal to or lower than a predetermined threshold value set, when the control unit determines that the low temperature conditions are met, the control unit executes the purging process so as to discharge more of moisture stored in the fuel cell to an outside of the fuel cell, as compared with when the control unit determines that the low temperature conditions are not met, and the control unit executes the charging process with target remaining capacity of the electric power storage device set to a smaller value, as compared with when the control unit determines that the low temperature conditions are not met.

In the fuel cell system according to the present aspect, in the case where it takes a relatively long time to charge the electric power storage device when the low temperature conditions are determined to be established upon the input of the stop instruction to the fuel cell system, the charging process is executed with the target remaining capacity set to a smaller value, as compared with the case of determining that the low temperature conditions are not established. Consequently, it is possible to shorten the time for the charging process so as to suppress the time required for completing the stopping of the system. Moreover, in the case of determining that the low temperature conditions are established, the control unit executes the purging process at the time of stopping the system, so as to discharge more of the moisture stored in the fuel cell to the outside of the fuel cell. Consequently, it is possible to suppress liquid water from freezing in the fuel cell, even in the case where an environmental temperature decreases after the stop of the system.

DETAILED DESCRIPTION

A. First Embodiment

Figure 1:
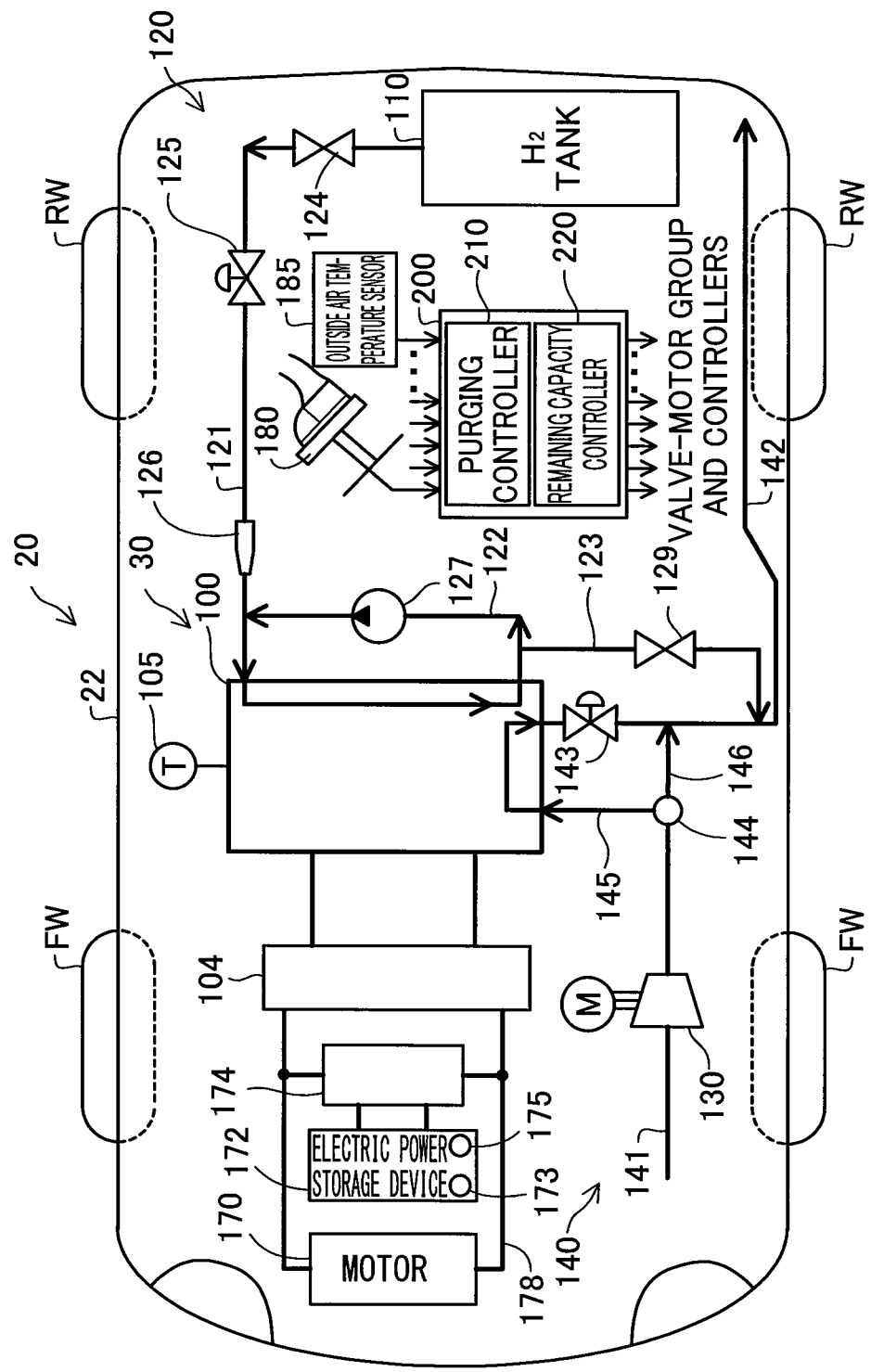
FIG. 1 shows a block diagram representing a schematic configuration of a fuel cell vehicle.

A-1. Overall Configuration of Fuel Cell System:

FIG. 1 shows the block diagram representing the schematic configuration of a fuel cell vehicle 20 equipped with a fuel cell system 30 serving as the first embodiment according to the present disclosure. The fuel cell vehicle 20 is equipped with, on a vehicle body 22, the fuel cell system 30 including a fuel cell 100, and further a drive motor 170 configured to generate driving force for the vehicle, an electric power storage device 172 capable of supplying power for driving the fuel cell vehicle 20, and a control unit 200. In the fuel cell vehicle 20, the fuel cell 100 and the electric power storage device 172 respectively and independently, or the fuel cell 100 and the electric power storage device 172 simultaneously are capable of supplying power to loads including the drive motor 170. The fuel cell 100 is connected to a load including the drive motor 170 via a DC/DC converter 104 and a wiring 178. The electric power storage device 172 is connected to a load including the drive motor 170 via a DC/DC converter 174 and the wiring 178. The DC/DC converter 104 and the DC/DC converter 174 are connected in parallel to the wiring 178.

The fuel cell system 30 includes the fuel cell 100, and further includes a hydrogen gas supply system 120 including a hydrogen tank 110, and an air supply system 140 including a compressor 130. The fuel cell system 30 further includes a cooling medium circulation system not shown configured to circulate, in the fuel cell 100, a cooling medium for keeping temperature of the fuel cell 100 in a predetermined range. The hydrogen gas supply system 120 and the air supply system 140 are also referred to as a "gas supply unit". The components included in the hydrogen gas supply system 120, the air supply system 140 and the cooling medium circulation system are driven when the fuel cell 100 generates power, and such components are also referred to as fuel cell auxiliary units.

The fuel cell 100 is formed in a stacked structure in which a plurality of unit cells are layered. The fuel cell 100 is a solid polymer type fuel cell of the present embodiment, or alternatively may be another type of fuel cell. Each of the unit cells included in the fuel cell 100 includes a flow path in an anode side through which hydrogen corresponding to fuel gas flows (hereinafter, also referred to as an anode-side flow path), and a flow path in a cathode side through which air corresponding to oxidizing gas flows (hereinafter, also referred to as a cathode-side flow path), with an electrolyte membrane interposed therebetween.

The fuel cell 100 includes an FC temperature sensor 105 capable of measuring temperature of the fuel cell 100. In an example, the FC temperature sensor 105 may be disposed in at least one of the above-described flow paths for the cooling media and may be a temperature sensor which detects temperature of the corresponding cooling medium which circulates in the fuel cell 100 and is discharged from the fuel cell 100. Alternatively, the FC temperature sensor 105 may be a sensor which directly detects temperature inside the fuel cell 100. The FC temperature sensor 105 is also referred to as a "third temperature sensor".

The hydrogen tank 110 included in the hydrogen gas supply system 120 is an apparatus for storing fuel gas containing hydrogen. Specifically, the hydrogen tank 110 may be a tank which stores high-pressure hydrogen gas, or a tank which includes hydrogen storage alloy inside and stores hydrogen by making the hydrogen storage alloy occlude hydrogen. The hydrogen gas supply system 120 includes a hydrogen supply flow path 121 extending from the hydrogen tank 110 to the fuel cell 100, a circulation flow path 122 for circulating anode off-gas containing unconsumed hydrogen gas to the hydrogen supply flow path 121, and a hydrogen discharge flow path 123 for discharging the anode off-gas to the atmosphere. In the hydrogen gas supply system 120, the hydrogen gas stored in the hydrogen tank 110 is made to flow through the hydrogen supply flow path 121 by opening and closing of an on-off valve 124 of the hydrogen supply flow path 121 and by decompression by a pressure reducing valve 125, and thereafter to be supplied from an injector 126 disposed in the downstream of the pressure reducing valve 125 to the anode-side flow path of the fuel cell 100. The pressure of the hydrogen circulating in the circulation flow path 122 is adjusted by a circulation pump 127. The driving amounts of the injector 126 and the circulation pump 127 are adjusted by the control unit 200 on the basis of target power to be output by the fuel cell 100.

It is noted that the hydrogen gas flowing through the circulation flow path 122 partially passes through an on-off valve 129 which is disposed in the hydrogen discharge flow path 123 branched from the circulation flow path 122 and is controlled with respect to opening/closing conditions, and is thereafter discharged to the atmosphere. Consequently, it is possible to discharge impurities (such as water vapor and nitrogen) other than the hydrogen contained in the hydrogen gas circulating in the circulation flow path 122, to the outside of the flow path, and suppress the increase of impurity concentration in the hydrogen gas to be supplied to the fuel cell 100. The opening/closing timing of the on-off valve 129 described above is controlled by the control unit 200.

The air supply system 140 supplies the fuel cell 100 with oxidizing gas (air in the present embodiment) containing oxygen. The air supply system 140 includes the compressor 130, and further includes a first air flow path 141, a second air flow path 145, a third air flow path 146, a flow dividing valve 144, an air discharge flow path 142, and a pressure regulating valve 143. The first air flow path 141 and the second air flow path 145 supply the air taken in by the air compressor 130 to the fuel cell 100. The second air flow path 145 is partially formed as the cathode-side flow path in the fuel cell 100. The third air flow path 146 is a bypass flow path which is connected to the first air flow path 141 so as to allow air to pass not via the fuel cell 100. The flow dividing valve 144 is disposed at a position where the first air flow path 141 is branched to the second air flow path 145 and the third air flow path 146, and is configured to change the distribution ratio of the air flowing into the second air flow path 145 and the third air flow path 146. The air passing through either the second air flow path 145 or the third air flow path 146 is discharged to the atmosphere through the air discharge flow path 142. The hydrogen discharge flow path 123 described above is connected to the air discharge flow path 142, and the hydrogen discharged through the hydrogen discharge flow path 123 is diluted with the air flowing through the air discharge flow path 142, prior to being discharged to the atmosphere. The pressure regulating valve 143 is disposed in the downstream side of the cathode-side flow path in the second air flow path 145, and is able to change the back pressure of the cathode-side flow path in the fuel cell 100 by adjusting the opening of the pressure regulating valve 143. The control unit 200 adjusts the driving amount of the compressor 130, the opening of the pressure regulating valve 143, and the opening conditions of the flow dividing valve 144.

The electric power storage device 172 is a chargeable and dischargeable type, and is charged with at least the power generated by the fuel cell 100. An allowable charging power Win in the electric power storage device 172 is set as the upper limit of charging power. That is, the allowable charging power Win is used as the upper limit of the charging power when controlling charging of the electric power storage device 172, in order to, for example, suppress the deterioration of the electric power storage device 172. In the electric power storage device 172 of the present embodiment, the allowable charging power Win has temperature dependency. As the lower the temperature is, the lower the allowable charging power Win is. The electric power storage device 172 may be, for example, a lithium ion battery or a nickel hydrogen battery. The electric power storage device 172 is not limited to the secondary battery as described above.

The electric power storage device 172 includes a remaining capacity monitor 173 and a temperature sensor 175. The remaining capacity monitor 173 detects an operating state, such as remaining capacity of the electric power storage device 172. The remaining capacity of the electric power storage device 172 is the index indicating the amount of charge in the electric power storage device 172. The remaining capacity is also referred to as a "state of charge". The remaining capacity monitor 173 may be configured to estimate remaining capacity, for example, by integrating a current value and a time of charging and discharging in the electric power storage device 172. Alternatively, the remaining capacity monitor 173 may be configured to derive remaining capacity by using a voltage of the electric power storage device 172. The remaining capacity monitor 173 outputs a signal indicating the remaining capacity to the control unit 200. The temperature sensor 175 detects temperature of the electric power storage device 172, and outputs a detection signal to the control unit 200. It is noted that the temperature sensor 175 may be configured to directly detect temperature of the electric power storage device 172, or to estimate temperature of the electric power storage device 172 by use of, for example, outside temperature and a heating value based on an amount of charge/discharge of the electric power storage device 172. The temperature sensor 175 is also referred to as a "first temperature sensor".

The DC/DC converter 104 has a function of changing the output conditions of the fuel cell 100 upon the reception of a control signal from the control unit 200. Specifically, the DC/DC converter 104 derives current and voltage from the fuel cell 100 for the loads described above, and controls the current and voltage to be derived from the fuel cell 100 by performing switching control. When supplying a load such as the drive motor 170 with the power generated by the fuel cell 100, the DC/DC converter 104 boosts the voltage output by the fuel cell 100 up to the voltage available by the load described above.

The DC/DC converter 174 has a charging/discharging control function for controlling the charging and discharging of the electric power storage device 172, and is configured to control the charging and discharging of the electric power storage device 172 upon the reception of the control signal from the control unit 200. Moreover, the DC/DC converter 174, in which the target voltage of the output side thereof is set under the control of the control unit 200, derives storage power from the electric power storage device 172 and applies voltage to the drive motor 170, so as to variably control the power derive conditions and the voltage level to be applied to the drive motor 170. It is noted that the DC/DC converter 174 is disconnected from the electric power storage device 172 and the wiring 178 when the charging or discharging is not required in the electric power storage device 172.

The control unit 200 is configured with a so-called microcomputer having a CPU configured to execute logical operations, a ROM, a RAM and the like. The control unit 200 acquires detection signals from various sensors, not only the sensors described above included in the hydrogen gas supply system 120 and the air supply system 140, but also an accelerator opening sensor 180, an outside air temperature sensor 185, a shift position sensor, a vehicle velocity sensor and the like, and performs various types of control related to the fuel cell vehicle 20. It is noted that the functional blocks shown in FIG. 1 represent some of the functions to be executed by the control unit 200. Specifically, the control unit 200 includes at least a purging controller 210 and a remaining capacity controller 220, as functional blocks. The operation of these functional blocks will be described later in more detail.

The control unit 200 is configured to control the whole fuel cell vehicle 20 in FIG. 1, or alternatively may have a different configuration. In an example, the control unit 200 may include a plurality of controllers, such as a controller configured to perform control relevant to operation of the fuel cell system 30, a controller configured to perform control relevant to traveling of the fuel cell vehicle 20, and a controller configured to perform control to vehicle auxiliary machines not relevant to the traveling, and also exchange necessary information among the plurality of controllers.

Figure 2:
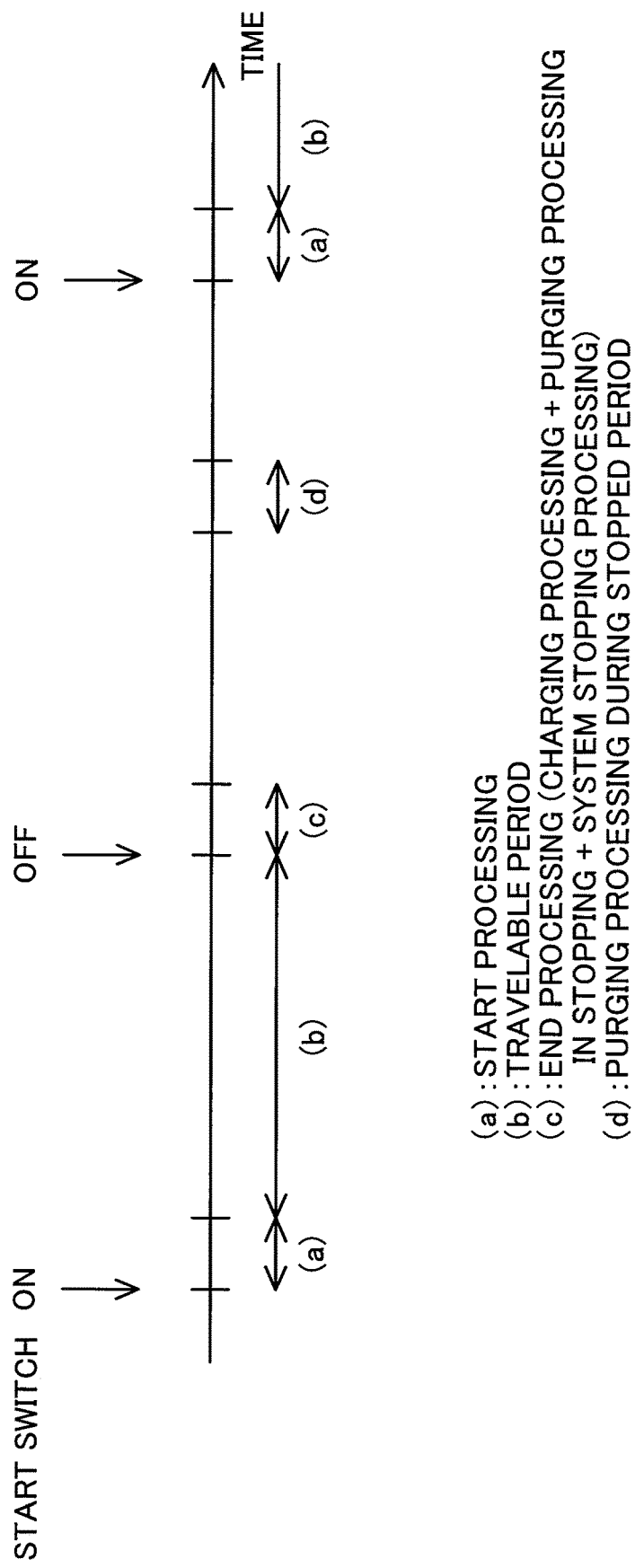
FIG. 2 shows an explanatory diagram schematically representing process which may be executed in the fuel cell vehicle.

A-2. Processing to be Executed in Fuel Cell Vehicle:

FIG. 2 shows the explanatory view schematically representing the processing which may be executed in the fuel cell vehicle 20. The fuel cell vehicle 20 includes a start switch not shown allowing a user to give an instruction to start and stop the fuel cell system 30. In FIG. 2, "ON" indicates the timing at which a start instruction is input to start the fuel cell system 30 by use of the start switch, and "OFF" indicates the timing at which a stop instruction is input to stop the fuel cell system 30. The following sequential descriptions are given on the basis of FIG. 2, with respect to the contents of various types of processing which may be executed in the fuel cell vehicle 20.

In response to the input of the start instruction through the start switch, the control unit 200 of the fuel cell system 30 executes "start processing". In FIG. 2, (a) indicates the period of time during which the "start processing" is executed. The "start processing" is executed during the period from the input of the start instruction to the start of the power generation in the fuel cell 100. The "start processing" may include, for example, the processing for starting the supply of hydrogen to the anode-side flow path and the supply of air to the cathode-side flow path, and the processing for connecting the fuel cell 100 and a load such as the drive motor 170. This allows the fuel cell 100 to supply power to a load such as the drive motor 170.

When the "start processing" is completed and the fuel cell 100 starts to generate power in the fuel cell system 30, the fuel cell vehicle 20 is brought into a travelable state. In FIG. 2, (b) indicates the travelable period during which the fuel cell vehicle 20 is capable of traveling. In the travelable period, as described above, the fuel cell vehicle 20 travels by using at least one of the fuel cell 100 and the electric power storage device 172 as a driving power source. At this time, the control unit 200 of the fuel cell vehicle 20 controls the driving conditions of the fuel cell system 30 and the drive motor 170, so that the remaining capacity of the electric power storage device 172 is equal to or more than a lower limit value set in advance.

Thereafter, when the stop instruction is input to stop the fuel cell system 30 by use of the start switch, the control unit 200 of the fuel cell system 30 executes "end processing". In FIG. 2, (c) indicates the period of time during which the "end processing" is executed. The "end processing" may include "charging process", "purging process in stopping" and "system stopping processing". As described later, the control unit 200 may execute "normal mode end processing" or "winter mode end processing" as the "end processing". The "normal mode end processing" and the "winter mode end processing" differ from each other in the contents of the "charging process" and the "purging process in stopping". The "normal mode end processing" and the "winter mode end processing" will be described in detail later.

The "charging process", which serves as the processing for increasing the remaining capacity of the electric power storage device 172 with the power generated by the fuel cell 100, is executed to charge the electric power storage device 172 by the fuel cell 100. The execution of the "charging process" allows the electric power storage device 172 to secure the power for executing various types of processing in the fuel cell system 30 during the period from the input of the stop instruction to the restart of the power generation by the fuel cell 100 in response to the next input of the start instruction after the input of the stop instruction. Therefore, in the case where the remaining capacity of the electric power storage device 172 at the time of the above-described input of the stop instruction is sufficient for the above-described power required by the electric power storage device 172, substantial charging operation may not be performed in the above-described "charging process. The "charging process" is executed by the remaining capacity controller 220 of the control unit 200 (refer to FIG. 1). Specific operation relevant to the "charging process" will be described in detail later.

The "purging process in stopping" is executed to purge, in stopping the power generation in the fuel cell 100, the both of the anode-side flow path and the cathode-side flow path with corresponding types of reaction gas respectively (fuel gas and oxidizing gas), so as to remove moisture from the flow paths. The "purging process in stopping" is executed by the purging controller 210 of the control unit 200 (refer to FIG. 1). In the "purging process in stopping", with respect to the anode-side flow path, the control unit 200 opens the on-off valve 124 and the injector 126 and drives the circulation pump 127, and further opens the on-off valve 129 at predetermined timing. With respect to the cathode-side flow path, the control unit 200 drives the compressor 130, while keeping the switching conditions of the flow dividing valve 144 so as to supply air to the cathode-side flow path. Consequently, it is possible to purge the anode-side flow path with hydrogen serving as fuel gas, and to purge the cathode-side flow path with air serving as oxidizing gas, so as to remove moisture from the flow path for fuel gas and moisture from the flow path for oxidizing gas. By removing of moisture from the flow paths for reaction gas, it is possible to suppress liquid water from remaining in the flow paths for reaction gas and to suppress the remaining liquid water from freezing, during the stopped period of the fuel cell system 30, that is, during the period before the restart of the fuel cell system 30 after the stop of the fuel cell system 30. In the "purging process in stopping", hydrogen is supplied to the anode-side flow path and air is supplied to the cathode-side flow path, and thus the fuel cell 100 is able to generate power. It is noted that in the case where the fuel cell auxiliary units and the like consume more power than the generated power in the "purging process in stopping", the power stored in the electric power storage device 172 is consumed in the "purging process in stopping".

In the "end processing", either the "charging process" or the "purging process in stopping" may be executed first. It is noted that in the case where the "charging process" is executed prior to the "purging process in stopping", the power required in the "purging process in stopping" can be easily secured by charging of the electric power storage device 172 prior to the "purging process", in the electric power storage device 172.

The "system stopping processing" is executed to stop the fuel cell system 30. The "system stopping processing" is executed after the completion of the "charging process" and the "purging process in stopping". In the "system stopping processing", the control unit 200 closes the on-off valve 124 of the hydrogen supply flow path 121, the on-off valve included in the injector 126, and the on-off valve 129 of the hydrogen discharge flow path 123. The present processing seals the flow path including the anode-side flow path from the injector 126 to the on-off valve 129 (hereinafter, such an entire flow path may also be referred to as the anode-side flow path), so that the hydrogen gas is enclosed therein. The control unit 200 stops the compressor 130, and closes the pressure regulating valve 143. The present processing seals the flow path including the cathode-side flow path from the compressor 130 to the pressure regulating valve 143 (hereinafter, such an entire flow path may also be referred to as the cathode-side flow path), so that air is enclosed therein.

When the flow paths are sealed as described above, the fuel cell 100 generates power by use of the hydrogen enclosed in the anode-side flow path and the oxygen in the air enclosed in the cathode-side flow path. The amount of the hydrogen enclosed in the anode-side flow path is excessive with respect to the amount of the oxygen in the air enclosed in the cathode-side flow path, and thus the power generation by the fuel cell 100 is stopped when the oxygen in the cathode-side flow path is consumed. As a result, the gas enclosed in the cathode-side flow path becomes the most part nitrogen. When the stop of the power generation in the fuel cell 100 is detected on the basis of, for example, the drop in voltage of the fuel cell 100, the control unit 200 disconnects the fuel cell 100 from loads such as the electric power storage device 172 and the fuel cell auxiliary units, and stops the fuel cell system 30.

When the fuel cell 100 stops power generation at the time of stopping the fuel cell system 30, gas cross leakage occurs via an electrolyte membrane between the anode-side flow path and the cathode-side flow path, in the fuel cell 100. This gradually brings the compositions of the gas in the anode-side flow path and the gas in the cathode-side flow path similar to each other, and thus the hydrogen in the anode-side flow path is gradually reduced in concentration.

During the stopped period of the fuel cell system 30, the control unit 200 may execute the "purging process during stopped period", in some cases. In FIG. 2, (d) indicates the period of time during which the "purging process during stopped period" is executed. Specific control relevant to the "purging process during stopped period" will be described in detail later.

Thereafter, upon the input of the start instruction through the start switch, the "start processing" described above is re-executed in the fuel cell system 30.

A-3. Operation after System Stop:

Hereinafter, the operation upon the input of the stop instruction through the start switch will be described in more detail.

Figure 3:
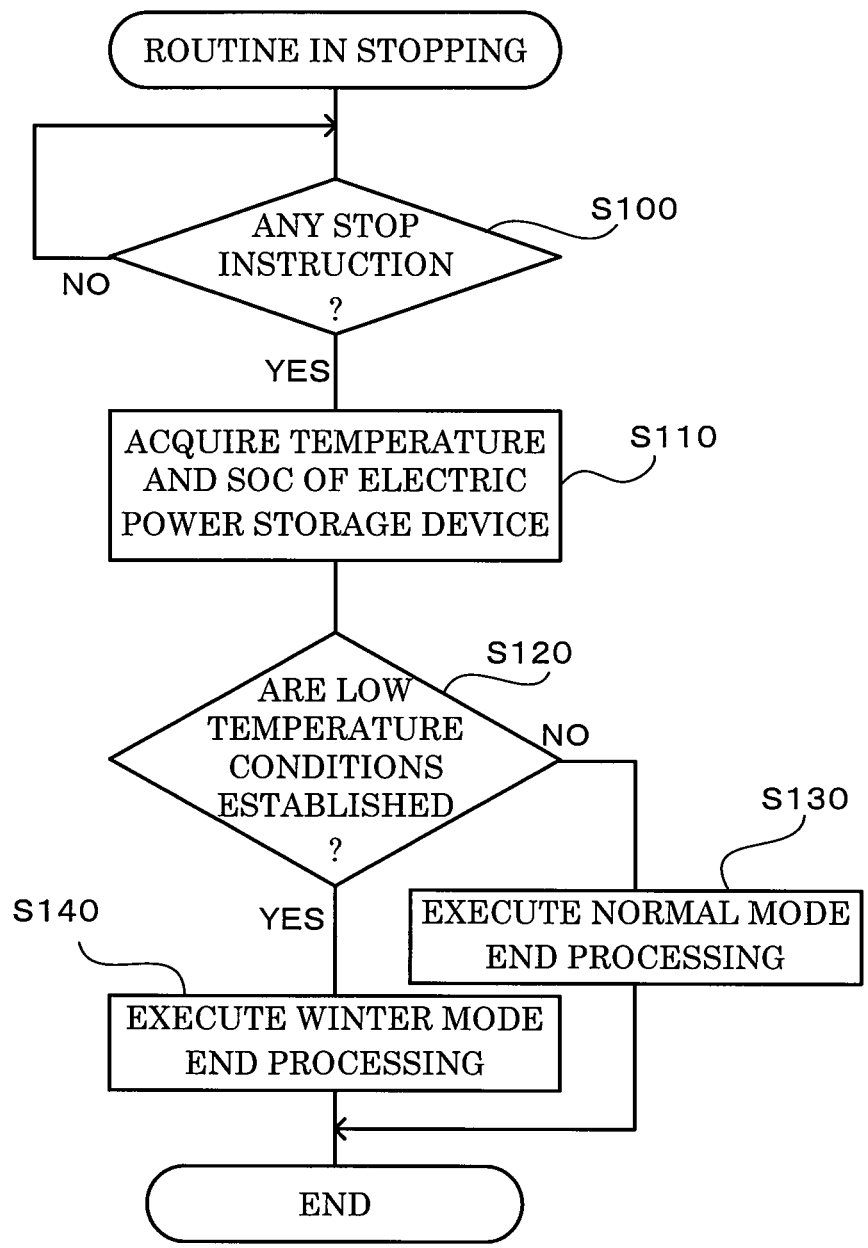
FIG. 3 shows a flowchart representing a routine in stopping.

FIG. 3 shows the flowchart representing the routine in stopping to be executed by the control unit 200 of the present embodiment. The present routine is executed by the control unit 200 during operation of the fuel cell system 30. When the routine is started, the CPU of the control unit 200 determines whether the stop instruction has been input through the start switch (step S100). The control unit 200 repeats the determination in step S100 until the stop instruction is input through the start switch.

When determining that the stop instruction has been input (step S100: YES), the CPU of the control unit 200 acquires the temperature of the electric power storage device 172 from the temperature sensor 175 corresponding to the first temperature sensor, and further acquires the remaining capacity of the electric power storage device 172 from the remaining capacity monitor 173 (step S110). The control unit 200 then determines whether or not low temperature conditions set in advance are established by using the acquired temperature and the acquired remaining capacity of the electric power storage device 172 (step S120).

The low temperature conditions are set in advance as the conditions for determining that the fuel cell 100 is highly likely to freeze. In the present embodiment, the set low temperature conditions include the temperature related to the fuel cell 100 being equal to or lower than the threshold set in advance. Specifically, in the present embodiment, in the case where the temperature of the electric power storage device 172 is equal to or lower than a first reference temperature set in advance, and where the remaining capacity of the electric power storage device 172 is equal to or less than a reference value set in advance, the low temperature conditions are determined to be established. In the present embodiment, the above-described first reference temperature relates to the state of the fuel cell, and is set to indirectly determine that the fuel cell 100 is highly likely to freeze, and further to determine that the temperature of the electric power storage device 172 decreases to the extent that it takes a relatively long time to charge the electric power storage device 172. The first reference temperature can be set, for example, in the range from −20° C. to −5° C.

The above-described reference value of the remaining capacity is set as the value to be used in determining whether or not the electric power storage device 172 is able to supply the power required by the fuel cell system 30 during the period, after the stop of the fuel cell system 30, until the fuel cell system 30 is restarted next time and the fuel cell 100 starts to generate power. The above-described power required by the fuel cell system 30 during the period until the fuel cell system 30 is restarted next time and the fuel cell 100 starts to generate power may include the power required in the "purging process during stopped period" to be described later. The above-described reference value of the remaining capacity can be set, for example, in the range from 40% to 50%.

Figure 4:
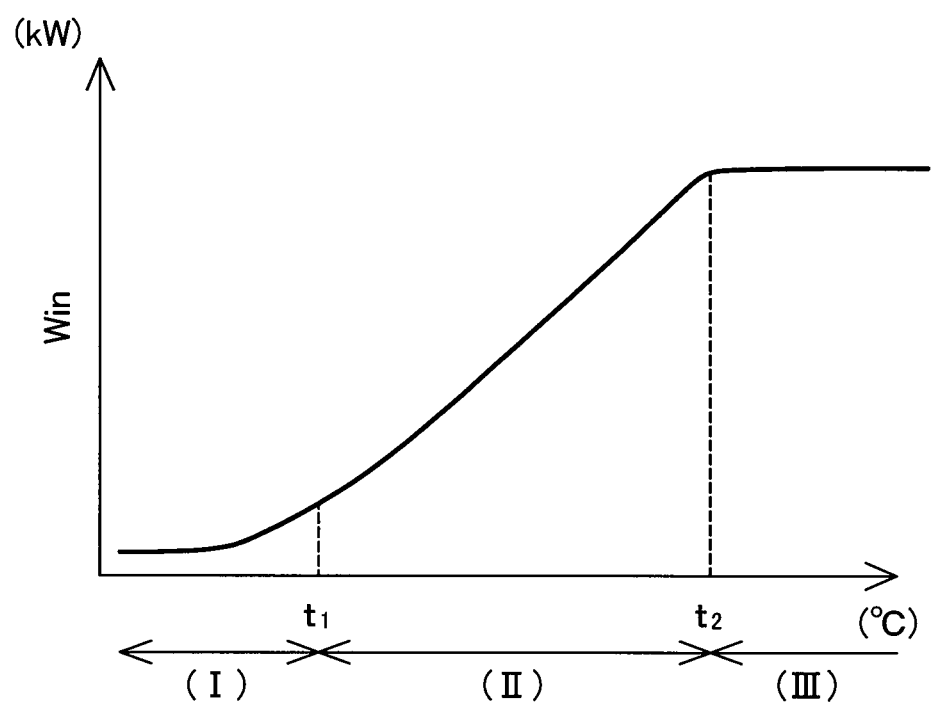
FIG. 4 shows an explanatory diagram representing relation between temperature and an allowable charging power Win of a electric power storage device.

FIG. 4 shows the explanatory diagram representing the relation between the temperature of the electric power storage device 172 and the allowable charging power Win of the electric power storage device 172. The above-described first reference temperature will be further described by use of FIG. 4. The allowable charging power Win, which is defined as the upper limit of the charging power in the electric power storage device 172, indicates the charge performance of the electric power storage device 172. The larger the allowable charging power Win is, the higher the charge performance is, that is, the faster the execution of the charging is. As shown in FIG. 4, the allowable charging power Win is strongly affected by the temperature of the electric power storage device 172. In FIG. 4, a temperature t1 is set as the temperature of the boundary between the temperature range (a range (I) shown in FIG. 4) in which the allowable charging power Win increases relatively gently as the temperature of the electric power storage device 172 increases and in which the allowable charging power Win is relatively small, and the temperature range (a range (II) shown in FIG. 4) in which the allowable charging power Win increases relatively rapidly as the temperature of the electric power storage device 172 increases. Moreover, in FIG. 4, a temperature t2 is set as the temperature of the boundary between the temperature range (the range (II) shown in FIG. 4) in which the allowable charging power Win increases relatively rapidly as the temperature of the electric power storage device 172 increases, and the temperature range (a range (III) shown in FIG. 4) in which the allowable charging power Win is stable at a relatively high level. The first reference temperature described above may be set to, for example, the temperature t1 or higher, and may be set in the range between the temperature t1 and the temperature t2 inclusive. The graph shown in FIG. 4 is merely one example. Especially, in the case where the electric power storage device 172 is a lithium ion battery, the allowable charging power Win is strongly affected by the temperature of the electric power storage device 172. It is noted that even in the case where the electric power storage device 172 is another type of electric power storage device, such as a nickel hydrogen battery, as long as the electric power storage device has the similar tendency in the allowable charging power Win, the first reference temperature is able to be set in the same manner.

In the case of determining that the low temperature conditions are established in step S120 (step S120: YES), the CPU of the control unit 200 executes the "winter mode end processing" (step S140), and finishes the present routine. In the case of determining that the low temperature conditions are not established in step S120 (step S120: NO), the CPU of the control unit 200 executes the "normal mode end processing" (step S130), and finishes the present routine.

As described above, the "end processing" can include the "charging process", the "purging process in stopping" and the "system stopping processing". The "normal mode end processing" and the "winter mode end processing" differ from each other in the contents of the "charging process" and the "purging process in stopping".

In the present embodiment, in the "winter mode end processing" executed when the low temperature conditions are established, the "purging process in stopping" is executed so as to discharge more of the moisture stored in the fuel cell 100 to the outside of the fuel cell 100, as compared with the "normal mode end processing" executed when the low temperature conditions are not established. In an example, in order to discharge more moisture to the outside of the fuel cell 100, the purging process in stopping in the "winter mode end processing" may be executed for a longer period of time, as compared with the case of the purging process in stopping in the "normal mode end processing". Alternatively, in the purging process in stopping in the "winter mode end processing", at least one type of the reaction gas to be supplied to the fuel cell 100 may be increased, as compared with the case of the purging process in stopping in the "normal mode end processing". The extent of increase of the moisture to be discharged in the "winter mode end processing" as compared with the "normal mode end processing" may be appropriately set, for example, so as to eliminate the need of the execution of the purging process during stopped period to be described later even in the case where an environmental temperature decreases during the stopped period of the fuel cell system 30 after the execution of the "winter mode end processing", as described later. The purging controller 210 of the control unit 200 executes the control relevant to the above-described purging process included in the end processing (refer to FIG. 1).

In the present embodiment, in the "winter mode end processing" executed when the low temperature conditions are established, the charging process is executed with the target remaining capacity of the electric power storage device 172 set to a smaller value as compared with the "normal mode end processing" executed when the low temperature conditions are not established. The extent of increase of the amount of charge in the "normal mode end processing" as compared with the case of the "winter mode end processing" may be appropriately set, for example, so as to allow the purging process during stopped period to be executed by use of the power supplied by the electric power storage device 172 in the case where the environmental temperature decreases during the stopped period of the fuel cell system 30 after the execution of the "normal mode end processing", as described later. The remaining capacity controller 220 of the control unit 200 executes the control relevant to the above-described charging process included in the end processing (refer to FIG. 1).

In the present embodiment, the case of the execution of the "winter mode end processing" at the time of stopping the fuel cell system 30 differs from the case of the execution of the "normal mode end processing", in the control relevant to the "purging process during stopped period" (refer to FIG. 2) executed during the stopped period of the system. The "purging process during stopped period" will be further described below. The "purging process during stopped period" is executed when the fuel cell system 30 is stopped, and when the freezing conditions set in advance as the conditions at which the fuel cell 100 is highly likely to freeze are established, in order to suppress liquid water from freezing in the flow paths for reaction gas in the fuel cell 100. In the fuel cell system 30 of the present embodiment, when the system is stopped, all the functions thereof are not completely stopped, and some functions and the like of the control unit 200 are kept in operation so as to monitor the temperature of the fuel cell 100, and purge the flow paths for reaction gas as the "purging process during stopped period", when needed. The purging controller 210 of the control unit 200 executes such control relevant to the purging process (refer to FIG. 1).

Figure 5:
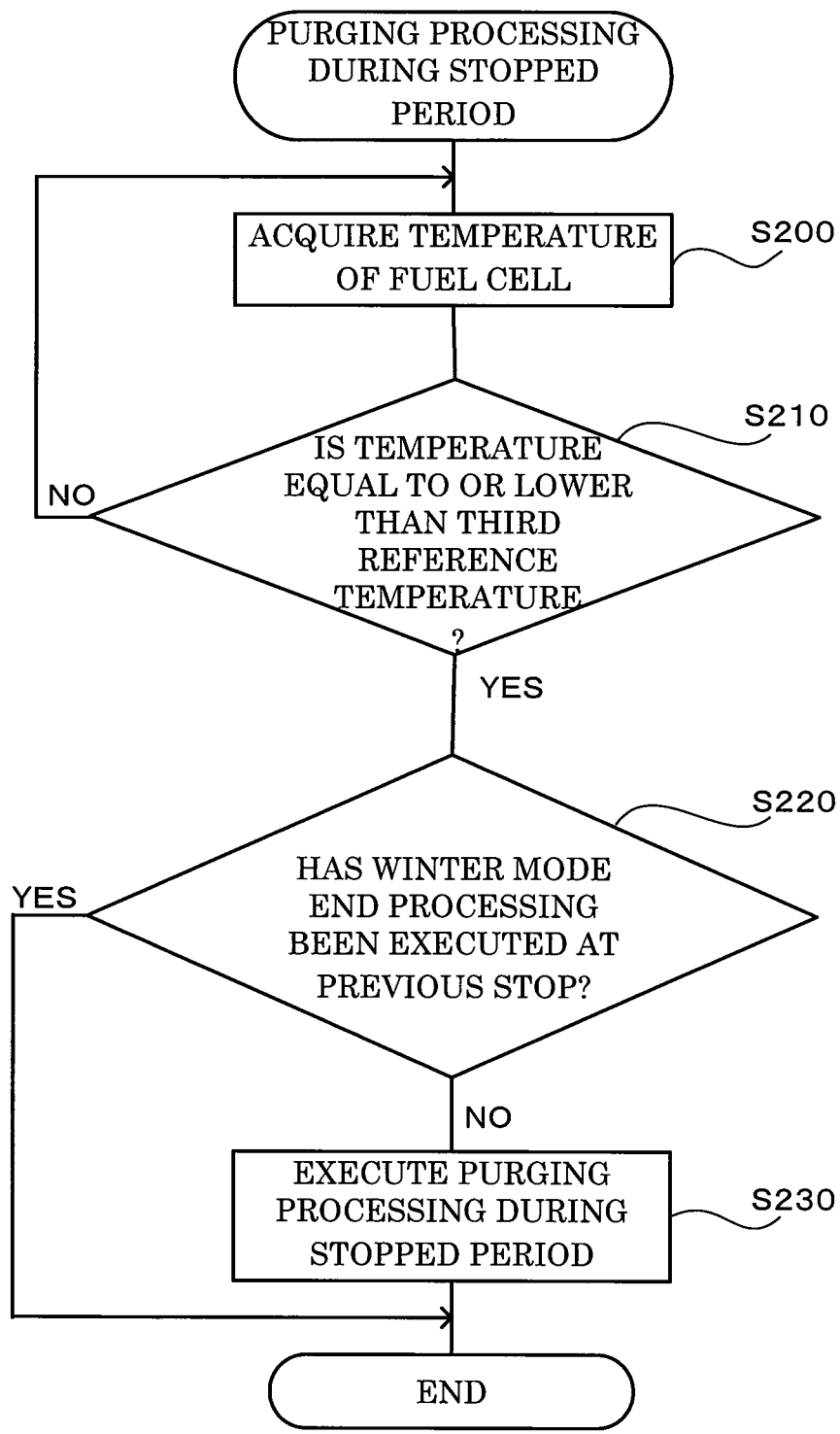
FIG. 5 shows a flowchart representing a routine of purging process during stopped period.

FIG. 5 shows the flowchart representing the routine of the purging process during stopped period to be executed by the control unit 200 of the present embodiment. The present routine is executed by the control unit 200 when the fuel cell system 30 is stopped, after the "end processing" is completed and the fuel cell system 30 is stopped.

When the present routine is started, the CPU of the control unit 200 acquires the temperature of the fuel cell 100 from the FC temperature sensor 105 (step S200). The control unit 200 then determines whether or not the acquired temperature of the fuel cell 100 is equal to or lower than the fuel cell temperature corresponding to a reference temperature set in advance (hereinafter, referred to as a third reference temperature) (step S210). In the case where the temperature of the fuel cell 100 is equal to or lower than the third reference temperature, the control unit 200 determines that the freezing conditions set in advance as the conditions at which the fuel cell 100 is highly likely to freeze are established. The third reference temperature is set in advance as a low temperature close to but higher than the freezing point. The third reference temperature may be set to, for example, 5° C. to 10° C. The control unit 200 repeats the execution of the steps of step S200 and step S210 until the temperature of the fuel cell 100 is determined to be equal to or lower than the third reference temperature.

When determining that the temperature of the fuel cell 100 is equal to or lower than the third reference temperature (step S210: YES), the CPU of the control unit 200 determines whether or not the low temperature conditions have been established at the time of the previous stop of the fuel cell system 30, that is, whether or not the winter mode end processing has been executed at the time of the previous stop (step S220). In the case where the winter mode end processing has not been executed at the time of the previous stop, that is, when the normal mode end processing has been executed (step S220: NO), the CPU of the control unit 200 executes the purging process during stopped period (step S230), and finishes the present routine. In the case where the winter mode end processing has been executed at the time of the previous stop (step S220: YES), the CPU of the control unit 200 finishes the present routine without executing the purging process during stopped period.

The "purging process during stopped period" will be further described below. In the "purging process during stopped period",—the control unit 200 temporarily starts the fuel cell system 30, to purge the anode-side flow path by using the hydrogen stored in the hydrogen tank 110. Specifically, the control unit 200 opens the on-off valve 124 and the injector 126 and drives the circulation pump 127, and further opens the on-off valve 129 at predetermined timing, so as to purge the anode-side flow path by using the hydrogen stored in the hydrogen tank 110. At this time, the control unit 200 drives the compressor 130 and switches the flow dividing valve 144, so as to make the whole amount of air flowing through the first air flow path 141 flow to the third air flow path 146. Consequently, the hydrogen discharged by the fuel cell system 30 through the hydrogen discharge flow path 123 is diluted.

In some cases, as the temperature of the fuel cell 100 decreases after the stop of the fuel cell system 30, the water vapor contained in the gas sealed in the flow path in the fuel cell 100 is condensed and becomes liquid water. Even in the case where liquid water is generated in the anode-side flow path, by executing the "purging process during stopped period", it is possible to remove the liquid water from the anode-side flow path, before the temperature of the liquid water decreases to the temperature at which the liquid water freezes, so as to suppress the generation of freezing in the anode-side flow path. In the present embodiment, only the anode-side flow path is purged as the "purging process during stopped period". Alternatively, only the cathode-side flow path may be purged by use of the compressor 130, or both of the anode-side flow path and the cathode-side flow path may be purged.

In the fuel cell system 30 having the above-described configuration in the present embodiment, in the case where the low temperature conditions set in advance are established when the stop instruction to the fuel cell system 30 is input, the purging process (the purging process in stopping) is executed so as to discharge more of the moisture stored in the fuel cell 100 to the outside of the fuel cell 100 as compared with the case where the low temperature conditions set in advance are not established. Furthermore, in the case where the above-described low temperature conditions are established, the charging process is executed with the target remaining capacity of the electric power storage device 172 set to a smaller value, as compared with the case where the low temperature conditions are not established. As described above, in the case where the low temperature conditions are established, and it takes a relatively long time to charge the electric power storage device 172, the charging process is executed with the target remaining capacity set to a smaller value as compared with the case where the low temperature conditions are not established. Consequently, it is possible to shorten the time for the charging process, and to suppress the time required for completing the stopping of the system. In the case where the low temperature conditions are established, the purging process is executed so as to discharge more of the moisture stored in the fuel cell 100 to the outside of the fuel cell 100. Thus, it is possible to suppress the liquid water from freezing in the fuel cell 100 even in the case where the environmental temperature decreases during the stop period of the system.

In the present embodiment, in the case where the low temperature conditions are not established, the charging process is executed with the target remaining capacity set to a larger value as compared with the case where the low temperature conditions are established. In the case where the low temperature conditions are not established, the temperature of the electric power storage device 172 is high, and thus it takes a relatively short time to charge the electric power storage device 172. Accordingly, even when the charging process is executed with the target remaining capacity set to a larger value, it does not take excessively long time to complete the stopping of the system. Moreover, in the case where the low temperature conditions are not established, a large amount of charge in the electric power storage device 172 is secured even if relatively less moisture is discharged to the outside of the fuel cell 100 by the purging process in stopping, and thus the purging process during stopped period is able to be executed during the stopped period of the system without any problem, when needed. In this way, by the above-described execution of the purging process during stopped period, it is possible to suppress liquid water from freezing in the fuel cell 100 even in the case where the environmental temperature decreases during the stopped period of the system. Moreover, it is considered that the environmental temperature is less likely to decrease to the temperature at which the freezing occurs during the stopped period of the system, in the case where the low temperature conditions are not established, and thus the purging process in stopping is executed with the target remaining capacity set to a small value, so as to suppress the excessive execution of the purging process.

As described above, regardless of whether or not the low temperature conditions are established, the present embodiment achieves to reduce the time required for completing the stopping of the system, and further to suppress the fuel cell 100 from freezing during the period, after the stop of the system, until the system is restarted next time and the fuel cell 100 starts to generate power.

It is noted that, in general, the energy amount required in the purging process during stopped period is greater than the increased amount of energy corresponding to the energy consumed by the execution of the purging process in stopping at the time when the low temperature conditions are established. In general, in the electric power storage device, such as a lithium ion battery, having temperature dependency in its allowable charging power Win, the charging at low temperature is more strictly restricted, as compared with the discharging at low temperature, from the viewpoint of preventing deterioration of the battery. Therefore, when the temperature of the electric power storage device 172 is low and the low temperature conditions are established, the extent of the prolonging of the time for stopping the system due to the prolonged time in the charging process of the case of adopting the normal mode end processing is larger than the extent of the prolonging of the time for stopping the system due to the prolonged time in the purging process in stopping of the case of adopting the winter mode end processing. Accordingly, the adoption of the configuration of the present embodiment achieves to shorten the time required for stopping the system, as a whole.

In the present embodiment, even when the remaining capacity of the electric power storage device 172 is equal to or lower than the reference value, as long as the temperature of the electric power storage device 172 is equal to or lower than the first reference temperature, the purging process in stopping is executed by adopting the winter mode end processing for stopping the system so as to set the target remaining capacity to a small value, and further so as to discharge more moisture to the outside of the fuel cell 100. Consequently, even in the case where the value of the remaining capacity of the electric power storage device 172 is small at the time of stopping the system, it is possible to suppress the time required for completing the stopping of the system from being prolonged due to the charging of the electric power storage device 172, and further suppress the fuel cell 100 from freezing by the purging process in stopping in the winter mode end processing. Even when the temperature of the electric power storage device 172 is equal to or lower than the first reference temperature, as long as the value of the remaining capacity of the electric power storage device 172 is above the reference value, the normal mode end processing is adopted at the time of stopping the system, and the purging process in stopping is executed so as to discharge less moisture to the outside of the fuel cell. Thus, it is possible to suppress energy from being consumed by the execution of the purging process in stopping at the time of stopping the system. As described above, when the value of the remaining capacity of the electric power storage device 172 at the time of stopping the system is large, the extent of charging the electric power storage device 172 is low, and thus even when the normal mode end processing is adopted with the target remaining capacity set to a large value, for the charging process to be executed at the time of stopping the system, the time required for completing the stopping of the system is suppressed from being prolonged due to the charging of the electric power storage device 172. Moreover, the value of the remaining capacity of the electric power storage device 172 at the time of stopping the system is large, and thus an anti-freezing measure can be executed to the fuel cell 100 during the stopped period of the system, when needed.

In the present embodiment, when the freezing conditions are established during the stopped period of the fuel cell system 30, in the case where the low temperature conditions have been determined not to be established at the time of previous stop of the fuel cell system 30, the purging process during stopped period is executed, while in the case where the low temperature conditions have been determined to be established at the time of previous stop of the fuel cell system 30, the purging process during stopped period is not executed. Therefore, in the case where the low temperature conditions have been determined not to be established at the time of previous stop of the fuel cell system 30, the purging process during stopped period is executed after the freezing conditions are established, so as to suppress the fuel cell from freezing. In the case where the low temperature conditions have been determined to be established at the time of previous stop of the fuel cell system 30, the fuel cell can be suppressed from freezing by the purging process in stopping having been executed as the winter mode end processing at the time of stopping the system.

It is noted that in the case where the low temperature conditions have been determined to be established at the time of previous stop of the fuel cell system 30 (step S220: YES), different operation from that in the above-described embodiment may be executed, as long as the purging process during stopped period is executed so as to discharge less of the moisture stored in the fuel cell 100 to the outside of the fuel cell 100, as compared with the case where the low temperature conditions have been determined not to be established (step S220: NO). In an example, in the case where the low temperature conditions have been determined to be established (step S220: YES), the purging process during stopped period may be executed with the purging in a shorter period of time, or the purging process during stopped period may be executed with less amount of gas to be supplied to the fuel cell 100, as compared with the case where the low temperature conditions have been determined not to be established (step S220: NO). It is noted that the configuration in which "the purging process during stopped period is executed so as to discharge less of the moisture stored in the fuel cell 100 to the outside of the fuel cell 100" includes the configuration in which the purging process during stopped period is not executed, as in the above-described embodiment.

In order to suppress the fuel cell 100 from freezing, when the low temperature conditions are not established, the value of the target remaining capacity for use in the charging process in the normal mode end processing may be set so as to acquire more power than the total of the power required in the end processing after the charging process, the power required in the purging process during stopped period, and the power required in the start processing, from the electric power storage device 172. The total power described above can be predicted in advance on the basis of the conditions of the respective types of processing described above, and thus the value of the target remaining capacity may be calculated in advance and stored in the control unit 200.

B. Second Embodiment

Figure 6:
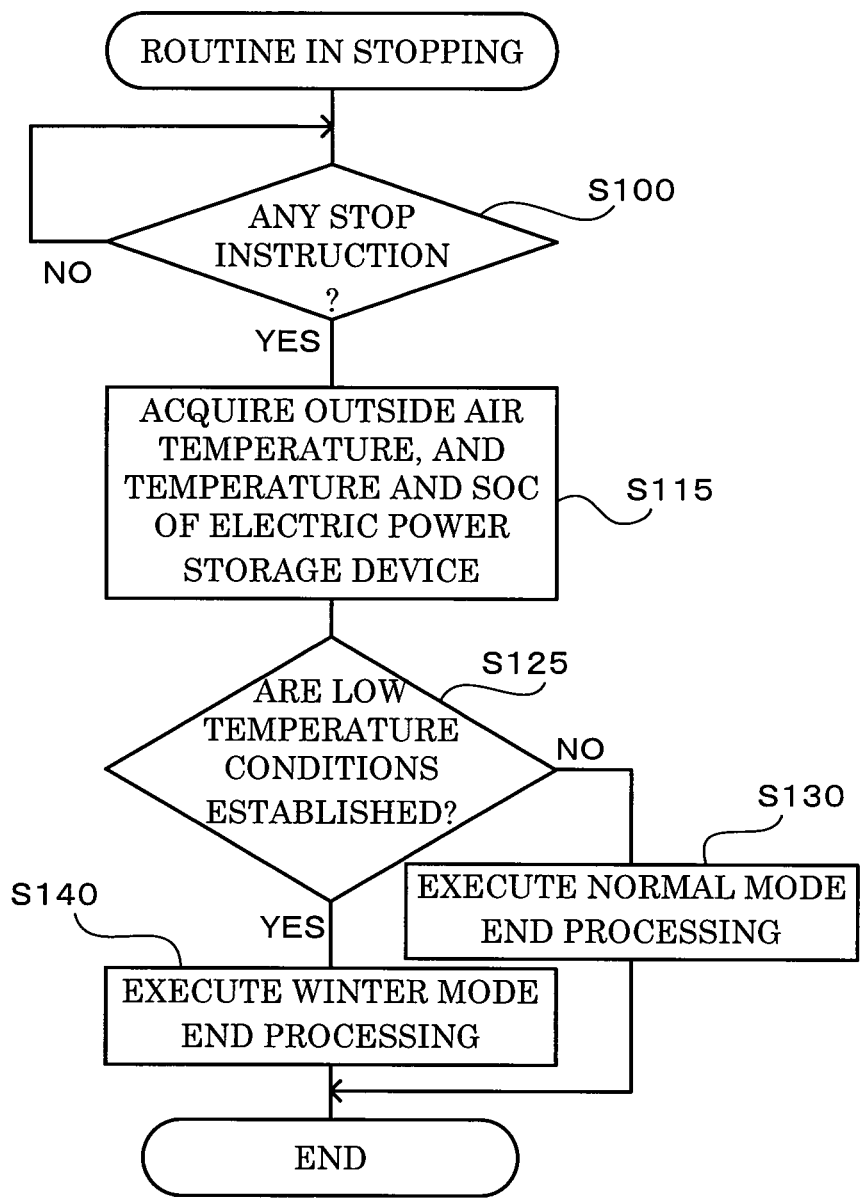
FIG. 6 shows a flowchart representing a routine in stopping.

FIG. 6 shows the flowchart representing the routine in stopping to be executed in the control unit 200 of the fuel cell system 30 according to the second embodiment of the present disclosure. The fuel cell system 30 of the second embodiment has the same configuration as that of the fuel cell system 30 of the first embodiment. Therefore, the same reference numbers are imparted to the parts common to the first embodiment, and the detailed descriptions thereof are omitted. The fuel cell system 30 of the second embodiment executes the start processing, the end processing, and the purging process during stopped period, as in the first embodiment shown in FIG. 2. The fuel cell system 30 of the second embodiment is different from that of the first embodiment, in the operation for determining whether or not the low temperature conditions are established.

The routine in stopping shown in FIG. 6 is executed in place of the routine in stopping of the first embodiment shown in FIG. 3. In FIG. 6, the same step numbers are imparted to the steps common to those in FIG. 3. The issues different from the first embodiment will be described below.

When determining that the stop instruction is input through the start switch (step S100: YES), the CPU of the control unit 200 of the second embodiment acquires the temperature of the electric power storage device 172 from the temperature sensor 175 serving as the first temperature sensor, acquires the remaining capacity of the electric power storage device 172 from the remaining capacity monitor 173, and further acquires the outside air temperature corresponding to the environmental temperature of the fuel cell system 30 from the outside air temperature sensor 185 (step S115). The outside air temperature sensor 185 is also referred to as a "second temperature sensor". The CPU of the control unit 200 determines whether or not the low temperature conditions set in advance are established, by using the acquired temperature and remaining capacity of the electric power storage device 172 and the acquired outside temperature (step S125).

In the second embodiment, in the case where in step S125 at least either the first low temperature conditions set in advance or the second low temperature conditions set in advance are established, the low temperature conditions are determined to be established. The first low temperature conditions are the same as the low temperature conditions of the first embodiment, and the first low temperature conditions are determined to be established in the case where the temperature of the electric power storage device 172 is equal to or lower than the first reference temperature set in advance, and where the remaining capacity of the electric power storage device 172 is equal to or less than the reference value set in advance. The second low temperature conditions are merely based on the outside temperature corresponding to the environmental temperature. In the case where the outside temperature is equal to or lower than a second reference temperature set in advance, the second low temperature conditions are determined to be established. In the second low temperature conditions, the outside temperature is used as the temperature related to the state of the fuel cell 100.

The second reference temperature described above is set as the temperature for use in determining that the execution of the purging process during stopped period is highly likely to be required during the stopped period of the fuel cell system 30. The second reference temperature can be set as, for example, the temperature at which the fuel cell 100 is highly likely to freeze during the stopped period of the system, and can be set equal to or lower than the third reference temperature in the routine of the purging process during stopped period shown in FIG. 5. This is because, when the environmental temperature is equal to or lower than the third reference temperature, it is considered that the temperature of the fuel cell 100 during the stopped period of the system is highly likely to decrease to the third reference temperature or lower. It is noted that the second reference temperature can be set higher than the third reference temperature. The second reference temperature may be set to 0° C. or below, at which the fuel cell 100 is especially-highly likely to freeze during the stopped period of the system.

The fuel cell system 30 of the second embodiment obtains the same effects as those in the first embodiment. In the second embodiment, when the environmental temperature is equal to or lower than the second reference temperature, the low temperature conditions are determined to be established regardless of the temperature and remaining capacity of the electric power storage device 172. Therefore, in the case where the execution of the purging process during stopped period is highly likely to be required during the stopped period of the system, the purging process in stopping is executed in advance so as to eliminate the need of the execution of the purging process during stopped period. As described above, in general, the energy required in the purging process during stopped period is larger than the extent of increase of the energy to be consumed by the execution of the purging process in stopping at the time when the low temperature conditions are established. According to the second embodiment, energy efficiency of the fuel cell system 30 is thus increased while suppressing the fuel cell 100 from freezing.

C. Other Embodiments

C1. In the first embodiment, the low temperature conditions are determined to be established when the first low temperature conditions are established. In the second embodiment, the low temperature conditions are determined to be established when at least either the first low temperature conditions or the second low temperature conditions are established. Alternatively, the establishment of the low temperature conditions may be determined on the basis of a different standard. In an example, only the second low temperature conditions may be used in determination for the low temperature conditions, without the usage of the value of the remaining capacity of the electric power storage device 172. It is noted that in the case where the value of the remaining capacity of the electric power storage device 172 is not used in determination for the low temperature conditions, and where the fuel cell vehicle 20 is parked in an indoor parking space in winter as an example, relatively high outside temperature may be detected in some cases, even when the temperature of the electric power storage device 172 is relatively low. In this case, if the normal mode end processing is selected on the basis of the outside temperature, it may take a relatively long time to charge the electric power storage device 172. In order to obtain the effect of reducing the time required for completing the stopping of the system while suppressing the fuel cell 100 from freezing regardless of, for example, a parking location of the fuel cell vehicle 20, the value of the remaining capacity of the electric power storage device 172 may be preferably used in determination for the low temperature conditions.

C2. In the above-described second embodiment, the second low temperature conditions are determined to be established when the environmental temperature detected by the outside air temperature sensor 185 is equal to or lower than the second reference temperature. Alternatively, a different configuration may be used. In an example, data indicating, for example, average temperature of the past few days, average minimum temperature of the past few days, or average temperature of the days of the same date of the past few years, may be acquired by communication or the like, and the second low temperature conditions may be determined to be established when such temperature is equal to or lower than a value set in advance.

C3. In each of the above-described embodiments, the freezing conditions are determined to be established when the temperature of the fuel cell 100 detected by the FC temperature sensor 105 serving as the third temperature sensor is equal to or lower than the third reference temperature during the stopped period of the system. Alternatively, a different configuration may be used. In an example, the freezing conditions may be determined to be established when the outside temperature corresponding to the environmental temperature decreases to a determination temperature set in advance or lower. Alternatively, the freezing conditions may be determined to be established when the outside temperature decreases to the determination temperature or lower, and further when the time elapsing after the decrease of the outside temperature to the determination temperature or lower exceeds a reference time set in advance.

C4. In each of the above-described embodiments, in the case where the freezing conditions are established during the stopped period of the system after the stop of the system by the normal mode end processing, the purging process during stopped period is executed as the anti-freezing measure for the fuel cell 100. Alternatively, a different configuration may be used. In an example, a heating device, such as a heater, configured to heat the fuel cell 100 may be disposed, and the fuel cell 100 may be heated by use of the above-described heating device when the freezing conditions are established during the stopped period of the system. In the case where the normal mode end processing is executed at the time of stopping the system, the charging process is executed with the target remaining capacity of the electric power storage device set to a large value. Consequently, it is possible to ensure the energy for the above-described heating and to obtain the same effects in the above embodiments.

C5. The fuel cell system 30 is used as a power source for driving a vehicle, or may be used as a power source for driving a moving body other than a vehicle. Alternatively, the fuel cell system 30 may be a stationary power generator.

The present disclosure is not limited to the above-described embodiments, and may be embodied in various configurations within the scope not deviating from the purport thereof. In an example, technical features of the embodiments may be replaced and combined as appropriate, in order to solve some or all of the above problems, or, in order to achieve some or all of the above-described effects. Unless the technical features are described as essential features in the present specifications, the technical features may be deleted, as appropriate. In an example, the present disclosure may be embodied in the aspects described below.

(1) In one aspect of the present disclosure, a fuel cell system is provided. The fuel cell system includes a fuel cell, a gas supply unit configured to supply gas to the fuel cell, an electric power storage device capable of storing at least electric power generated by the fuel cell, a remaining capacity monitor configured to detect remaining capacity in the electric power storage device; and a control unit configured to execute purging process for purging an inside of the fuel cell with the gas by driving the gas supply unit, and charging process for charging the remaining capacity of the electric power storage device with the power generated by the fuel cell, wherein upon input of stop instruction of the fuel cell system, the control unit determines whether the temperature conditions are met, wherein the low temperature conditions include temperature related to a state of the fuel cell being equal to or lower than a predetermined threshold value set, when the control unit determines that the low temperature conditions are met, the control unit executes the purging process so as to discharge more of moisture stored in the fuel cell to an outside of the fuel cell, as compared with when the control unit determines that the low temperature conditions are not met, and the control unit executes the charging process with target remaining capacity of the electric power storage device set to a smaller value, as compared with when the control unit determines that the low temperature conditions are not met.

In the fuel cell system according to the present aspect, in the case where it takes a relatively long time to charge the electric power storage device when the low temperature conditions are determined to be established upon the input of the stop instruction to the fuel cell system, the charging process is executed with the target remaining capacity set to a smaller value, as compared with the case of determining that the low temperature conditions are not established. Consequently, it is possible to shorten the time for the charging process so as to suppress the time required for completing the stopping of the system. Moreover, in the case of determining that the low temperature conditions are established, the control unit executes the purging process at the time of stopping the system, so as to discharge more of the moisture stored in the fuel cell to the outside of the fuel cell. Consequently, it is possible to suppress liquid water from freezing in the fuel cell, even in the case where an environmental temperature decreases after the stop of the system.

(2) The fuel cell system according to the aspect described above further includes a first temperature sensor configured to detect temperature of the electric power storage device, wherein when the temperature of the electric power storage device is equal to or lower than a predetermined first reference temperature and the remaining capacity of the electric power storage device is equal to or less than a predetermined reference value, the control unit may determine that the low temperature conditions are met. In the fuel cell system according to the present aspect, even in the case where the remaining capacity of the electric power storage device is equal to or lower than the reference value, as long as the temperature of the electric power storage device is equal to or lower than the first reference temperature, the control unit executes the purging process with the target remaining capacity for charging the electric power storage device set to a small value so as to discharge more moisture to the outside of the fuel cell, at the time of stopping the system. Consequently, it is possible to, even in the case where the value of the remaining capacity is small, suppress the fuel cell from freezing, while suppressing the time required for completing the stopping of the system from being prolonged due to the charging of the electric power storage device. Even in the case where the temperature of the electric power storage device is equal to or lower than the first reference temperature, as long as the value of the remaining capacity of the electric power storage device is above the reference value, the control unit executes the purging process so as to discharge less moisture to the outside of the fuel cell. Consequently, it is possible to suppress energy from being consumed by the execution of the purging process at the time of stopping the system. As described above, in the case where the value of the remaining capacity is large at the time of stopping the system, the amount of charge is small even if the value of the target remaining capacity for the charging process at the time of stopping the system is set to a large value, and thus the time required for completing the stopping of the system is suppressed from being prolonged due to the charging of the electric power storage device. Moreover, the value of the remaining capacity is large at the time of stopping the system, and thus an anti-freezing measure is able to be executed to the fuel cell during the stopped period of the system, when needed.

(3) The fuel cell system according to the aspect described above further includes a second temperature sensor configured to detect an environmental temperature of the fuel cell system, wherein when the environmental temperature is equal to or lower than a predetermined second reference temperature, the control unit may determine that the low temperature conditions are met.

In the fuel cell system according to the present aspect, in the case where the environmental temperature is equal to or lower than the second reference temperature, regardless of the temperature and the remaining capacity of the electric power storage device, the control unit determines that the low temperature conditions are established. Therefore, in the case where the fuel cell is highly likely to freeze during the stopped period of the system, the purging process is executed at the time of stopping the system in advance. Consequently, the need of the anti-freezing measure for the fuel cell can be eliminated during the stopped period of the system. As a result, it is possible to increase energy efficiency of the fuel cell system, while suppressing the fuel cell from freezing.

(4) In the fuel cell system according to the aspect described above, when freezing conditions are met during a stopped period of the fuel cell system and when the control unit has determined that the low temperature conditions are met at time of previous stop of the fuel cell system, the control unit may execute purging process during stopped period so as to discharge less of the moisture stored in the fuel cell to the outside of the fuel cell, as compared with when the control unit determines the low temperature conditions are not met, wherein the freezing conditions are set in advance as conditions highly likely to occur freeze in the fuel cell.

In the fuel cell system according to the present aspect, in the case of having determined the non-establishment of the low temperature conditions at the time of previous stop of the fuel cell system, the control unit executes the purging process during stopped period after the freezing conditions are established. Consequently, it is possible to suppress the fuel cell from freezing. In the case of having determined the establishment of the low temperature conditions at the time of previous stop of the fuel cell system, the control unit executes the purging process during stopped period during the stopped period of the system so as to discharge more of the moisture stored in the fuel cell to the outside of the fuel cell. Thus, it is possible to suppress the fuel cell from freezing.

(5) The fuel cell system according to the aspect described above further includes a third temperature sensor configured to detect temperature of the fuel cell, wherein when the temperature of the fuel cell is equal to or lower than a predetermined third reference temperature, the control unit may determine that the freezing conditions are met. In the fuel cell system according to the present aspect, the control unit is able to determine that the freezing is highly likely to occur in the fuel cell, by using the temperature of the fuel cell.

The present disclosure is able to be embodied in various aspects, for example, a control method of the fuel cell system, a computer program for realizing the control method, and a non-transitory recording medium configured to store the computer program.

What is claimed is:

1. A fuel cell system comprising:
   a fuel cell;
   a gas supply unit configured to supply gas to the fuel cell;
   an electric power storage device capable of storing at least electric power generated by the fuel cell;
   a remaining capacity monitor configured to detect a remaining capacity in the electric power storage device; and
   a control unit configured to execute a purging process for purging an inside of the fuel cell with the gas by driving the gas supply unit, and a charging process for charging the remaining capacity of the electric power storage device with the power generated by the fuel cell, wherein
   upon input of a stop instruction of the fuel cell system, the control unit determines whether low temperature conditions are met, wherein the low temperature conditions include a temperature related to a state of the fuel cell being equal to or lower than a predetermined threshold value,
   when the control unit determines that the low temperature conditions are met, the control unit executes the purging process so as to discharge more of moisture stored in the fuel cell to an outside of the fuel cell, as compared with when the control unit determines that the low temperature conditions are not met,
   when the control unit determines that the low temperature conditions were met at a time of a previous stop of the fuel cell system, and the purging process was performed at the time of the previous stop of the fuel cell system, the control unit does not execute the purging process during a subsequent stopped period of the fuel cell system even when freezing conditions are established during the subsequent stopped period, and
   the control unit executes the charging process with a target remaining capacity of the electric power storage device set to a smaller value, as compared with when the control unit determines that the low temperature conditions are not met.

2. The fuel cell system according to claim 1, the fuel cell system further comprising:
   a first temperature sensor configured to detect a temperature of the electric power storage device, wherein when the temperature of the electric power storage device is equal to or lower than a predetermined first reference temperature and the remaining capacity of the electric power storage device is equal to or less than a predetermined reference value, the control unit determines that the low temperature conditions are met.

3. The fuel cell system according to claim 1, the fuel cell system further comprising:
a second temperature sensor configured to detect an environmental temperature of the fuel cell system, wherein
when the environmental temperature is equal to or lower than a predetermined second reference temperature, the control unit determines that the low temperature conditions are met.

4. The fuel cell system according to claim 1, the fuel cell system further comprising:
a third temperature sensor configured to detect temperature of the fuel cell, wherein
when the temperature of the fuel cell is equal to or lower than a predetermined third reference temperature, the control unit determines that the freezing conditions are met.

5. A control method of a fuel cell system, the fuel cell system comprising:
a fuel cell;
a gas supply unit configured to supply gas to the fuel cell;
an electric power storage device capable of storing at least electric power generated by the fuel cell; and
a remaining capacity monitor configured to detect remaining capacity in the electric power storage device, the control method comprising the steps of:
upon input of a stop instruction to the fuel cell system, determining whether low temperature conditions are met, wherein the low temperature conditions include a temperature related to a state of the fuel cell being equal to or lower than a predetermined threshold value set;
when determining that the low temperature conditions are met, executing a purging process so as to discharge more of moisture stored in the fuel cell to an outside of the fuel cell, as compared with when determining that the low temperature conditions are not met, the purging process being executed to discharge the moisture stored in the fuel cell to the outside of the fuel cell by driving the gas supply unit;
when determining that the low temperature conditions were met at a time of a previous stop of the fuel cell system, and the purging process was performed at the time of the previous stop of the fuel cell system, not executing the purging process during a subsequent stopped period of the fuel cell system even when freezing conditions are established during the subsequent stopped period; and
executing a charging process with a target remaining capacity of the electric power storage device set to a smaller value, as compared with when determining that the low temperature conditions are not met, the charging process being executed to charge the remaining capacity of the electric power storage device with the power generated by the fuel cell.

* * * * *